March 6, 1934. F. MARX 1,949,751
INDIVIDUAL AND COMBINATION AUTO SLEEPER TENT
Filed Jan. 5, 1933 2 Sheets-Sheet 1
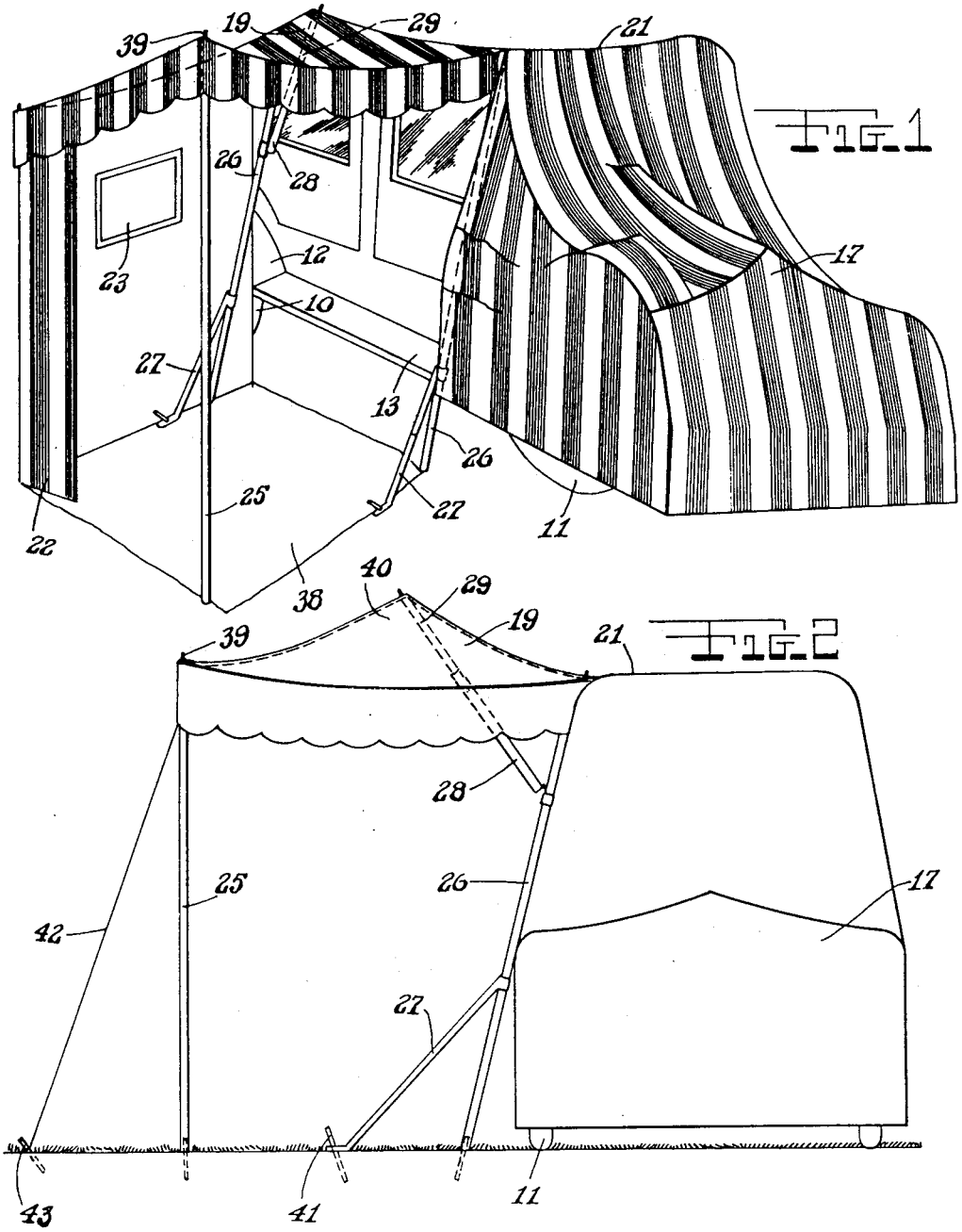
INVENTOR
F. Marx
BY HIS ATTORNEY March 6, 1934.  F. MARX  1,949,751
INDIVIDUAL AND COMBINATION AUTO SLEEPER TENT
Filed Jan. 5, 1933  2 Sheets-Sheet 2
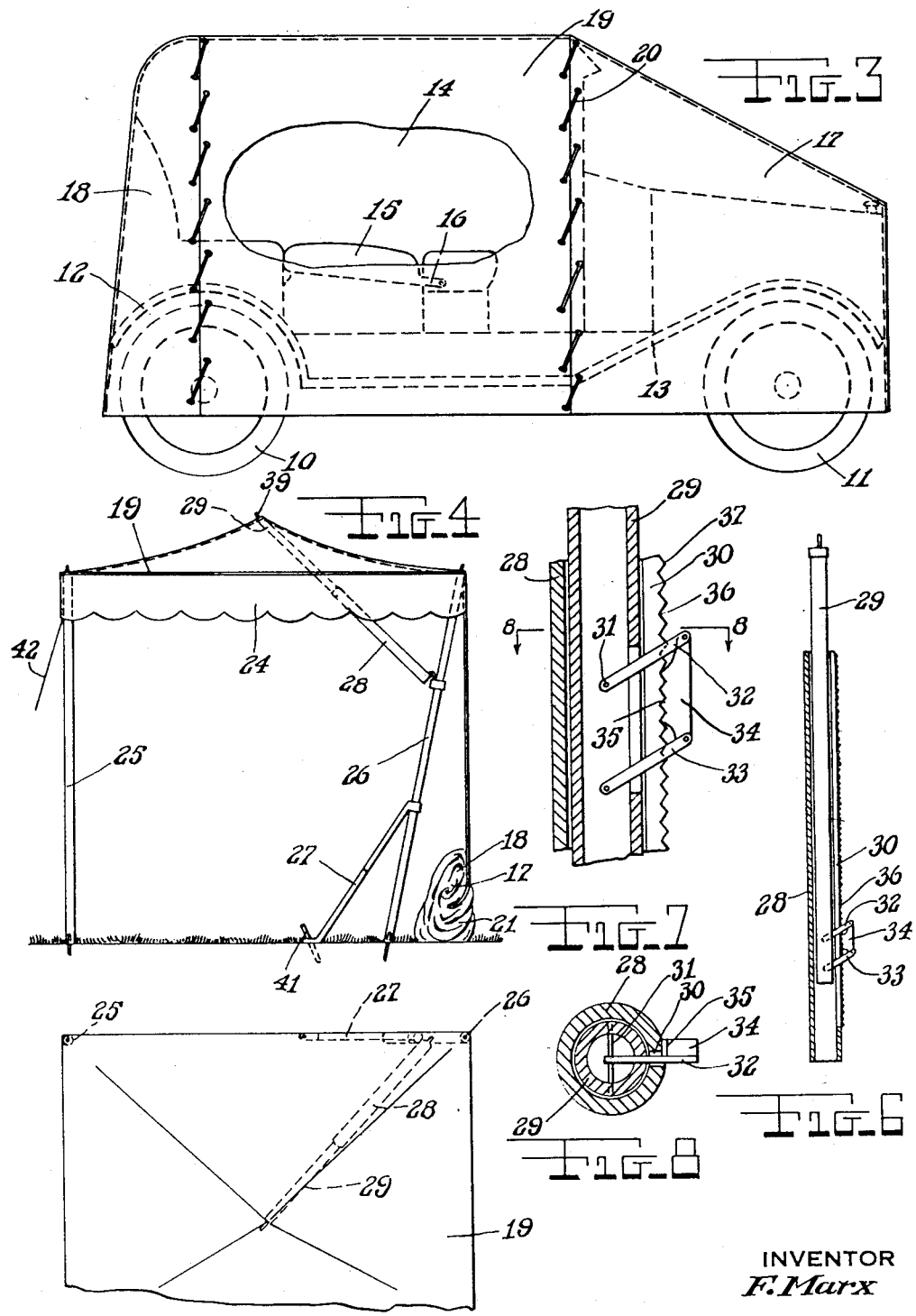
INVENTOR
*F. Marx*
BY HIS ATTORNEY Patented Mar. 6, 1934

1,949,751

UNITED STATES PATENT OFFICE 1,949,751

INDIVIDUAL AND COMBINATION AUTO SLEEPER TENT

Fred Marx, Mount Vernon, N. Y.

Application January 5, 1933, Serial No. 650,218

3 Claims. (Cl. 135—5)

The main object of this invention is to provide a tarpaulin tent for wheeled vehicles and has for its purpose to construct a shed or shelter over a vehicle such as an auto, in a quick and ready manner.

Another object of the invention is to provide individual and combination auto sleeper tent which is adapted to serve the purpose of a complete shelter for a wheeled vehicle such as an auto and has its sides so constructed as to provide a pair of transversely extending canopies. These canopies serve as a roof shelter for the occupants of the vehicle when the walls are raised upon slits as shown in the several figures of the drawings.

Still another object of the invention is to provide an individual and combination auto sleeper tent for a wheeled vehicle, so constructed as to permit the erection of canopies, one on each side of the vehicle, for the purpose of providing living and sleeping accommodations for the occupants of the vehicle.

The above and other objects will become apparent in the description below in which characters of reference refer to like named parts in the drawings.

Referring briefly to the drawings, Figure 1 is a perspective view of the shelter tent covering an auto, with one of the walls extended to form a canopy.

Figure 2 is a front elevational view of the auto sleeper tent with one erected canopy.

Figure 3 is a side elevational view of an auto showing the tent battened down over the vehicle.

Figure 4 is a side elevational view of the canopy with the vehicle removed from place to illustrate the independent canopy supports of the structure.

Figure 5 is a fragmentary top plan view of Figure 4.

Figure 6 is a longitudinal, sectional, elevational view showing the roof mast in partly extended position.

Figure 7 is an enlarged sectional, elevational view of the telescoping roof mast, showing the means for locking these members in releasable position.

Figure 8 is a cross sectional view taken on line 8—8 of Figure 7.

Referring in detail to the drawings, the numerals 10 and 11 indicate the rear and front wheels of an automatic vehicle. These wheels are surmounted by the usual mudguards 12 and 13. Within the tonneau, 14, of the vehicle, a front and rear seat are usually provided. The front seat has a back rest, 15, which is preferably hinged at its lower end, 16, so that the same may be sunk rearwardly to serve as a mattress area for some of the occupants of the vehicle when it is desired to use the same as a sleeping chamber.

The entire vehicle to position below the hubs of the wheels is entirely concealed beneath a cover which comprises a front portion, 17, and rear portion, 18, and a pair of flaps such as is indicated by the numeral 19, one flap on each side of the vehicle. These flaps when in unused position are strapped over the sides of the vehicle by thongs, 20, which slip through eyelets arranged at the edges of the cover and the flaps. The flap members, 19, when arranged in a horizontal position extending from the roof 21 of the cover member, serve as a canopy beneath which living with a greater or leeser degree of comfort may be carried on when wall flaps 22 are suspended from the canopy. These wall flaps may be provided with windows 23 or similar other apertures by which light may be admitted into the enclosure.

The canopy is provided with a hem, 24, which conceals the means for securing the standards, 25, in place on the canopy. Two sets of standards are used in erecting this canopy shelter. The outer corners of the canopy are provided with vertical standards 25, previously enumerated, while at the inner ends adjacent to vehicle, angular standards 26 are provided and are so pressed by stanchions 27 so that the drag, when the vehicle is removed from its cover will not collapse the canopy.

One of the standards 26 serves as a mounting or anchor for the lower end of a telescoping mast. This mast extends upwardly in an angular plane and is comprised of two members, an outer shell 28 and an inner sleeve, 29. The outer shell is provided with a linear channel 30, while the inner sleeve has a pair of pins, 31, arranged diametrically. These pins carry the inner ends of a pair of parallelly moving links, 32 and 33.

Said links are coupled at their free outer ends in a pivoted manner by a locking block 34, upon one face of which teeth, 35, are formed, said teeth register in the recesses, 36, of a plurality of triangular ridges 37, which latter are formed adjacent to the channel 30 of the outer shell.

The device is adapted to serve as a shelter against the elements for an auto or similar other vehicles. The shelter completely encloses the vehicle and is provided with a pair of flaps which cover the sides of the vehicles and when horizontally extended form canopies from which flaps 22 may be suspended to completely enclose a chamber beneath the canopy. This canopy is adapted to be shaped into a domed, conical roof with the aid of the telescoping sleeve and shell 29 and 28 respectively. The sleeve may be extended so that various angles may be shaped into the roof in order to drain the rain to a greater or lesser degree.

The sleeve 29 may be locked in a quick and ready manner at any position along the length of the shell 28 by means of the ridges 37 co-operating with the teeth on the locking block, 34. After the canopy has been completely erected a floor covering such as 38 may be provided so that a dry interior is had.

All of the corner standards 25 and 26 are provided with draping pins 39 which latter pierce the corners of the canopy fabric and serve to prevent the pins from becoming displaced. The upper end of the sleeve 29 is also provided with such a draping pin 39 and passes thru an opening in the center of the canopy. When the sleeve 29 is extended out of the shell 28, a cone 40 is formed which aids in draining the rain water. Since the standards 25 and 26 are never precisely located the canopy would droop and present a saucer-like contour which would collect water. To overcome this I use the adjustable member consisting of parts 28 and 29 in fashioning a cone of the canopy to serve as a drain.

The lower ends of the standards 25 and 26 and braces 27 are secured in the soil by fixing pins 41 which latter are first driven into the soil after which the standards (hollow at their lower ends) are impaled on the pins.

To prevent a sidewise drag of the canopy when the canopy serves as an independent unit after the vehicle has been wheeled away, tie ropes 42 are secured to the upper ends of the standards 25 and course angularly downward, being secured to the soil by stakes 43.

It is to be noted that certain changes in form and construction may be made without departing from the spirit and scope of the invention.

I claim:

1. In combination with a cover for a vehicle having a roof, said cover having side flaps thereon, adapted to be extended horizontally, means for supporting said flaps away from said vehicle comprising standards for sustaining the corners of said flaps when the latter are extended horizontally, telescoping means anchored to one of said standards for raising the center of the canopy formed by said flaps when horizontal, the lifting of said center being adapted to provide a rain drain, said telescoping member comprising an outer shell anchored to said standard, a sleeve sliding into said shell, teeth on said shell, and means carried by said sleeve co-operating with said teeth for releasably locking said sleeve in any desired extended position to vary the angle of said canopy.

2. In combination with a cover for a vehicle having a roof, said cover having side flaps thereon, adapted to be extended horizontally, means for supporting said flaps away from said vehicle comprising standards supporting the corners of said flaps when extended, telescoping means anchored to one of said standards for lifting the center of the canopy, for providing a rain drain, said telescoping member comprising an outer shell anchored to said standard, a sleeve sliding into said shell, teeth on said shell, links pivoted to said sleeve and means secured pivotally to said links for engaging the teeth of said shell to releasably lock said sleeve in any desired extended position.

3. In combination with a cover for a vehicle having a roof, said cover having side flaps thereon, adapted to be extended horizontally, means for supporting said flaps away from said vehicle comprising standards supporting the corners of said flaps when extended, telescoping means anchored to one of said standards for lifting the center of the canopy, for providing a rain drain, said telescoping member, comprising an outer shell anchored to said standard, a sleeve sliding into said shell, teeth on said shell, links pivoted to said sleeve, a locking block pivotally secured to said links, said links being arranged parallel and teeth on said locking block being adapted to co-operate with said teeth on said shell to releasably lock said shell and sleeve to each other at any desired position.

FRED MARX.